CIRCUIT ARRANGEMENT FOR DYNAMIC POSTFOCUSING IN ELECTROSTATIC FOCUSING CATHODE-RAY TUBES
Filed Jan. 11, 1961
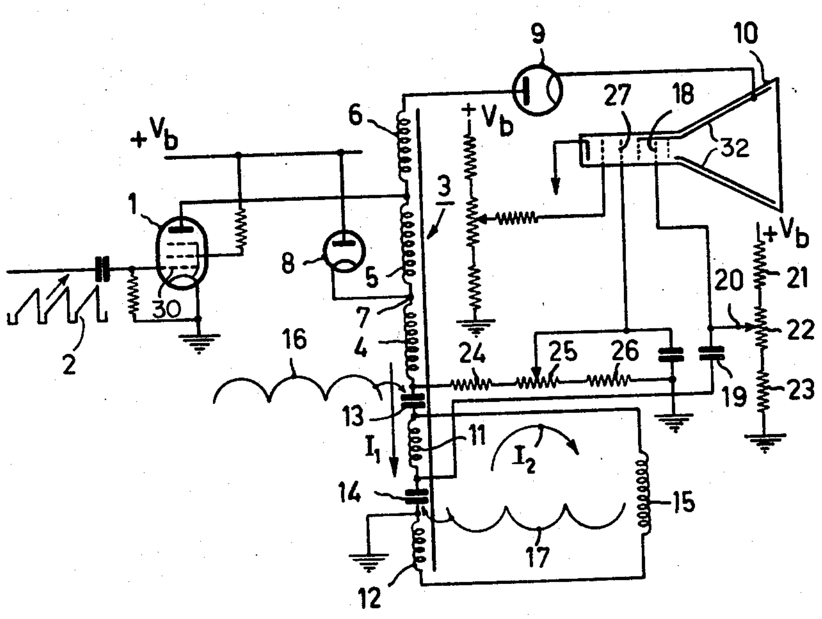
INVENTOR
PETER J. H. JANSSEN.
BY Frank R. Jifani
AGENT 3,146,373

CIRCUIT ARRANGEMENT FOR DYNAMIC POST-FOCUSING IN ELECTROSTATIC FOCUSING CATHODE-RAY TUBES

Peter Johannes Hubertus Janssen, Eindhoven, Netherlands, assignor to North American Philips Company, Inc., New York, N.Y., a corporation of Delaware Filed Jan. 11, 1961, Ser. No. 82,048
Claims priority, application Netherlands Feb. 17, 1960
6 Claims. (Cl. 315—22)

This invention relates to a circuit arrangement for the dynamic postfocusing of electro-statically focused beams in cathode-ray tubes. The invention is particularly adapted for use in television receivers, in which the electron beam in the tube is deflected by a substantially sawtooth-shaped current produced in a deflection coil by means of an amplifying element, to the control-electrode of which is fed a voltage releasing this element periodically and the output circuit of which includes a transformer with which the deflection coil is coupled. The arrangement also comprises a booster-diode circuit with which is associated at least one capacitor, the capacitor being connected in series with at least one of the windings of the transformer. A parabola-shaped waveform voltage obtained from the said capacitor is applied to the focusing electrode of the cathode-ray tube. A variable direct voltage for static focusing is also applied to the focusing electrode.

Such a circuit arrangement is disclosed in German patent application No. 1,056,175, G 23,452. Herein the phase of the parabolic voltage occurring with the wrong polarity across the capacitor associated with the booster-diode is inverted by means of a transformer before this voltage is fed to the focusing electrode.

This involves the use of a separate transformer, which has to meet high requirements as to quality to ensure an undistorted transfer of the parabolic waveform voltage.

In accordance with the invention this additional transformer can be omitted, if the capacitor associated with the booster-diode circuit is one of two capacitors which are alternately connected in series with at least two transformer windings. In this circuit the capacitor from which the postfocusing voltage is derived is included in the circuit containing one of the two transformer windings and the deflection coil. One electrode of this capacitor is connected to earth, the other being coupled to the focusing electrode.

It should be noted that by splitting up the capacitor associated with the booster-diode circiut and by including one capacitor in that part of the circuit which is traversed by a current opposite the current passing through the circuit portion including the other capacitor, parabolic waveform voltages of opposite polarities are produced across the two capacitors. Consequently, there is always one parabolic waveform voltage of the correct polarity available, which can be fed by way of a coupling capacitor to the focusing electrode of the cathode-ray tube.

This means that the desired postfocusing can be obtained by adding an additional capacitor associated with the booster-diode circuit and a few additional windings on the core of the line output transformer already provided. An additional core fulfilling severe quality requirements can thus be dispensed with for the transformer.

The capacitor from which the parabolic waveform voltage with the correct polarity can be obtained is included in the line deflection circuit, so that automatically an undistorted, parabolic waveform voltage is available across this circuit.

A possible embodiment of the circuit arrangement according to the invention will now be described more fully by way of example with reference to the accompanying drawing.

In this figure the valve 1 is the output valve included in the line deflection circuit; to the control-grid 30 thereof is fed a control-voltage 2, which periodically releases the valve. The anode circuit of this valve includes the line output transformer 3, which has windings 4, 5 and 6. To the tapping 7 between the windings 4 and 5 is connected the cathode of a booster-diode 8. The anode of the diode 8 is connected to a source of a positive voltage of $V_b$ volts.

The winding 6 serves to step up by transformation the fly-back pulses. These pulses are produced during the fly-back of the sawtooth current, which is produced by means of this circuit. The stepped-up pulses are rectified by means of the diode 9 and fed to the final anode 32 of the cathode-ray tube 10, which serves as the display tube.

In order that, in accordance with the invention, the parabolic voltage can be obtained with the correct polarity from a capacitor associated with the booster-diode circuit without the addition of a further transformer, the transformer 3 is provided not only with the windings 4, 5 and 6 but also with the windings 11 and 12, which are magnetically coupled with windings 4, 5 and 6 and with the capacitors 13 and 14 associated with the booster-diode circuit and connected in series with the said windings. The capacitor 13 is connected between the windings 4 and 11 and the capacitor 14 between the windings 11 and 12. The junction of the capacitor 14 and winding 12 is connected to ground and this capacitor 14 is associated with that part of the circuit which includes the deflection coil 15.

The windings 4, 5 and 11 may be considered as the primary winding of an autotransformer; they are traversed by the same current $I_1$ and the windings 11 and 12, which are traversed by the current $I_2$, may be considered to be the secondary winding of this autotransformer. Owing to the transformer properties of the autotransformer 3 the current $I_2$ is opposite the current $I_1$, and since the number of turns of the windings 4, 5 and 11, in common, exceeds the number of turns of the windings 11 and 12, $I_2$ exceeds $I_1$.

The current $I_1$ passes not only through the windings 4, 5 and 11 but also throuugh the capacitor 13. This current $I_1$ has a sense such that across the capacitor 13 is produced not only a high direct voltage (the so-called booster voltage of about 800 to 900 v.) but also a parabolic waveform voltage 16 fluctuating around the said direct voltage, the polarity of the said voltage being such that its maxima occur each time after half a period of the sawtooth current $I_1$. This is possible, since the value of the capacitor 13 is chosen to have a small capacitive reactance at the frequency of the current $I_1$. The current $I_2$, which passes through the windings 11 and 12 and through the capacitor 14 and the deflection coil 15, exceeds the current $I_1$, as stated above and its sense is opposite that of the latter, so that the capacitor 14 is traversed by a current $I_2-I_1$, of which the sense is the same as that of the current $I_2$ and hence produces across the capacitor 14, which is of the same order as the capacitor 13, a parabolic waveform voltage 17 having a polarity opposite that of the voltage 16. The parabolic voltage 17 has therefore the correct polarity to be used as a postfocusing voltage for the focusing electrode 18 of the display tube 10. To this end the ungrounded electrode of the capacitor 14 is connected by way of a bidirectional current conducting path including the separation capacitor 19 to the said focusing electrode 18. By a correct choice of the capacitance value of the capacitor 14 at a given value of the current $I_2-I_1$ the voltage 17 may at the same time have the desired amplitude.

The focusing electrode 18 is also connected to the variable tapping 20, which is provided in a potentiometer circuit consisting of the resistors 21, 22 and 23. This potentiometer circuit is connected between the positive terminal of a supplying voltage source and earth. By means of the variable tapping 20 the direct voltage at the focusing electrode 18 can be adjusted to obtain the static focusing which provides that the non-deflected electron beam produced in the display tube is focused at the center of the display screen.

If this electron beam is deflected, however, dynamic postfocusing is required, as is known, owing to the flatness of the display screen of the tube 10. This postfocusing is obtained by means of the parabolic waveform voltage 17 supplied by the above-described circuit.

It should be noted that the winding 12 is not strictly necessary. This winding is provided only to ensure that the voltage at the conductors connecting the deflection coil 15 to the windings 11 and 12 should be symmetrical with respect to earth potential. Thus undesirable radiation of these conductors is avoided. If this radiation is acccepted, the winding 12 may be omitted, and the desired parabolic waveform voltage 17 will still be produced across the capacitor 14.

It is furthermore shown in the figure that the junction of the capacitor 13 with the lower end of the winding 4 is connected, by way of a potentiometer circuit consisting of the resistors 24, 25 and 26, to ground. The variable tapping of the resistor 25 is connected to the acceleration anode 27 of the tube 10, so that by displacing the last-mentioned tapping the acceleration voltage for the anode 27 can be adjusted.

Although in the present embodiment the acceleration voltage for the anode 27 is chosen to exceed the voltage for the focusing electrode 18, it may be desirable under certain conditions to choose the reverse proportion. This may be achieved in a simple manner by connecting the free end of the resistor 21 to the junction of the capacitor 13 and the winding 4 and the free end of the resistor 24 to the positive terminal of the supply voltage source. The operation of the arrangement is the same as far as the postfocusing of the electron beam is concerned.

It should be noted that instead of using a discharge valve 1 use may be made of a different amplifying element, for example, a transistor. It is only essential that a sawtooth current should be produced through the deflection coil 15, which current produces, in addition, a parabolic waveform voltage 17, which may be used as a postfocusing voltage.

What I claim is:

1. A dynamic focusing circuit for a cathode-ray tube employing electromagnetic deflection, said tube having an electrostatic focusing electrode, said circuit comprising an amplifier device having an output electrode, a source of operating potential having first and second terminals, a transformer having at least first and second inductively coupled windings, said first winding having a tap, means connecting said output electrode to one end of said first winding, first capacitor means connected between the other end of said first winding and one end of said second winding, second capacitor means connected between one of said terminals and the other end of said second winding, booster diode means connected between said first terminal and said tap, deflection yoke means, means connecting said yoke means between said one end of said second winding and said other electrode of said second capacitor means, bidirectional current conducting means connecting said focusing electrode to said one electrode of said second capacitor means whereby a parabolic waveform voltage is applied to said focusing electrode, and means connected to said amplifier device for periodically interrupting current flow to said output electrode.

2. A dynamic focusing circuit for a cathode-ray tube employing electromagnetic deflection, said tube having an acceleration electrode, said circuit comprising an amplifier device having an output electrode and an input electrode, a source of operating potential having first and second terminals, a transformer having first and second inductively coupled windings, first and second capacitors, a series circuit of said first winding, said first capacitor, said second winding, and said second capacitor connected in that order between said output electrode and said second terminal, a tap on said first winding, booster diode means connected between said first terminal and said tap, deflection yoke means, means coupling said deflection yoke means to said transformer whereby a current with a sawtooth waveform flows in said yoke means, means connected to said input electrode for periodically interrupting current flow to said output electrode, and means connecting the junction of said first winding and first capacitor to said acceleration electrode, whereby a voltage with a parabolic waveform is applied to said acceleration electrode.

3. The circuit of claim 2, comprising means for connecting said deflection yoke means in parallel with said second winding and second capacitor.

4. The circuit of claim 2, in which said transformer comprises a third inductively coupled winding having one end connected to said second terminal, and means connecting said yoke means in parallel with said second and third windings and second capacitor.

5. A dynamic focusing circuit for a cathode-ray tube employing electromagnetic deflection, said tube having an electrostatic focusing electrode and an acceleration electrode, said circuit comprising an amplifier device having an output electrode and an input electrode, a source of operating potential having first and second terminals, a transformer having first and second inductively coupled windings, first and second capacitors, a series circuit of said first winding, said first capacitor, said second winding, and said second capacitor connected in that order between said output electrode and said second terminal, a tap on said first winding, booster diode means connected between said first terminal and said tap, deflection yoke means, means coupling said deflection yoke means to said transformer whereby a current with a sawtooth waveform flows in said yoke means, means connected to said input electrode for periodically interrupting current flow to said output electrode, means connecting the junction of said first winding and first capacitor to said acceleration electrode, and bidirectional current conducting means connecting the junction of said second capacitor and second winding to said focusing electrode, whereby voltages with opposite polarity parabolic waveforms are applied to said focusing and acceleration electrodes.

6. A dynamic focusing circuit for a cathode-ray tube employing electromagnetic deflection, said tube having an electrostatic focusing electrode, said circuit comprising an amplifier device having an output electrode and an input electrode, a source of operating potential having first and second terminals, a transformer having first and second inductively coupled windings, first and second capacitors, a series circuit of said first winding, said first capacitor, said second winding, and said second capacitor connected in that order between said output electrode and said second terminal, a tap on said first winding, booster diode means connected between said first terminal and said tap, deflection yoke means, means coupling said deflection yoke means to said transformer whereby a current with a sawtooth waveform flows in said yoke means, means connected to said input electrode for periodically interrupting current flow to said output electrode, and bidirectional current conducting means connecting the junction of said second winding and second capacitor to said focusing electrode, whereby a voltage with a parabolic waveform is applied to said focusing electrode.

References Cited in the file of this patent

UNITED STATES PATENTS 2,588,659 Pond ________________ Mar. 11, 1952